March 7, 1933. F. P. McBERTY 1,900,834
ELECTRIC WELDING MACHINE
Filed April 22, 1929 6 Sheets-Sheet 2
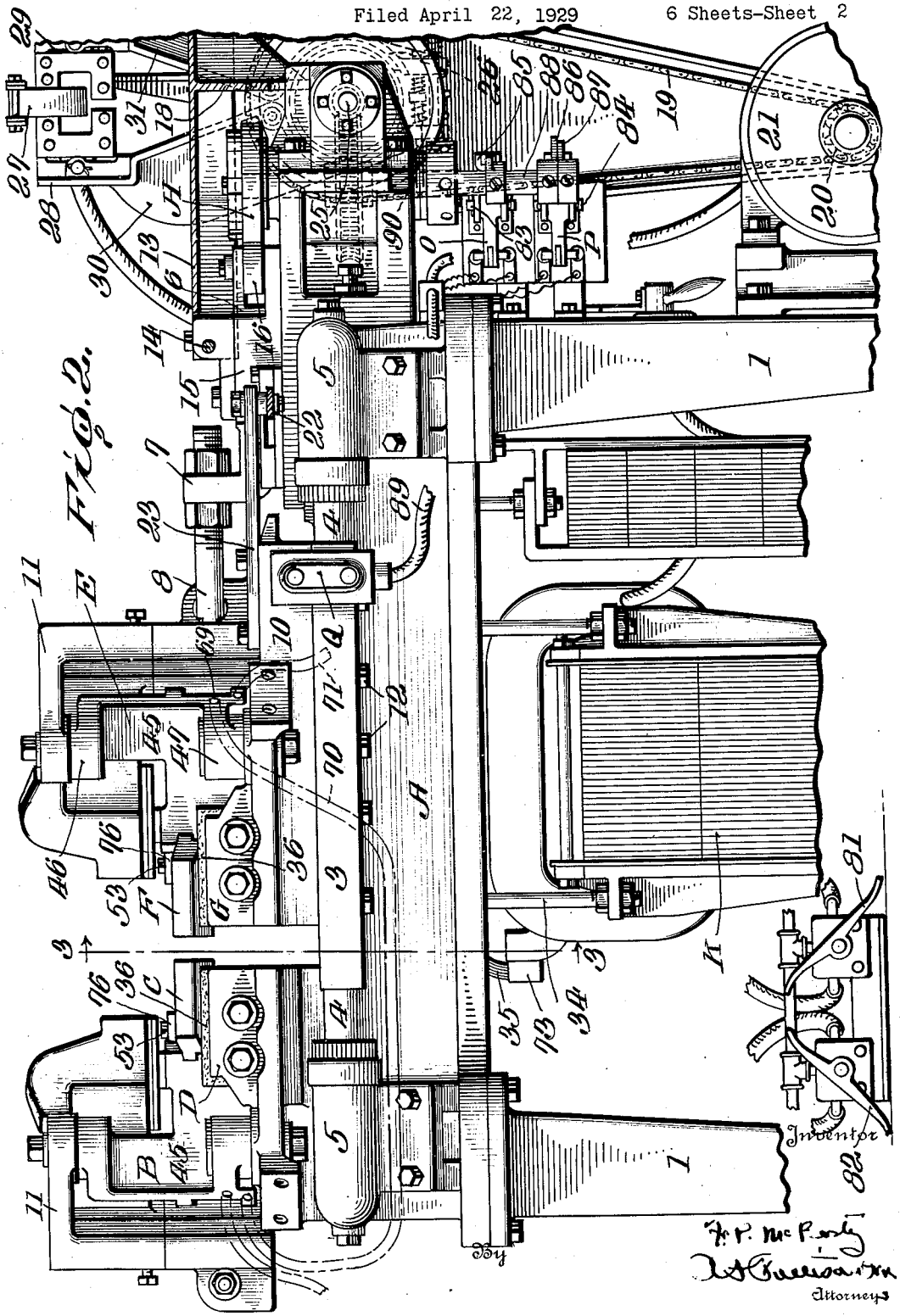

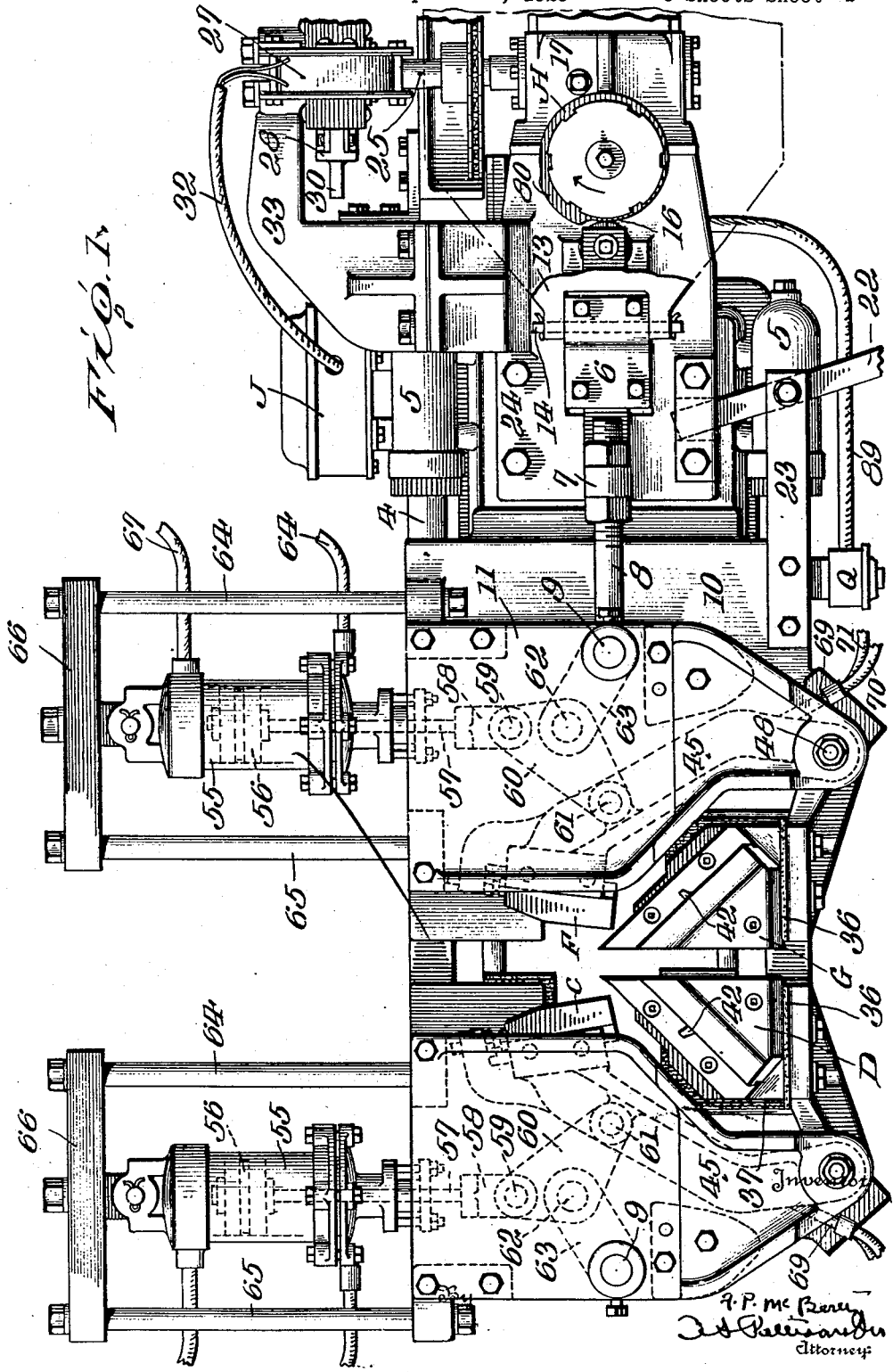

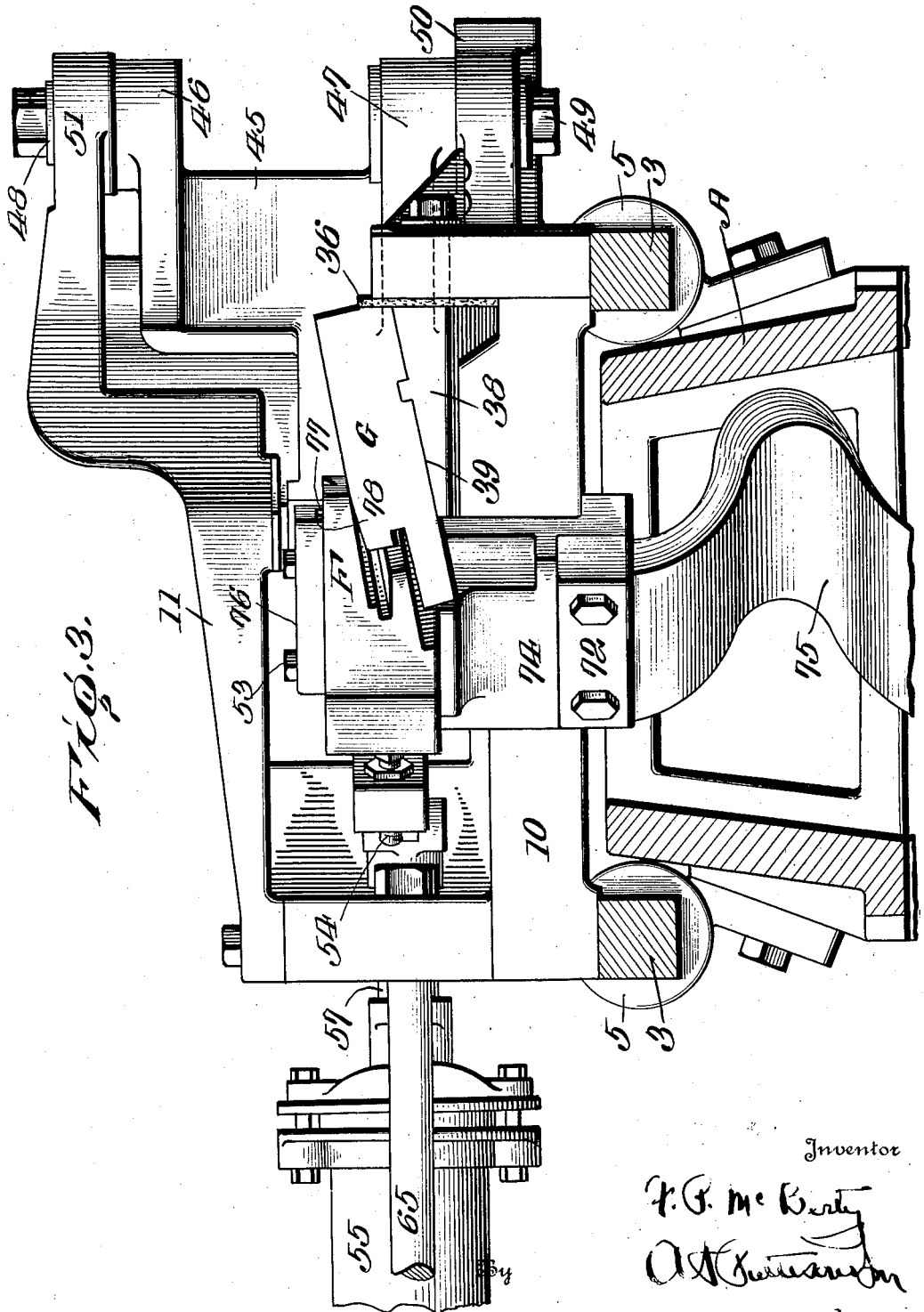

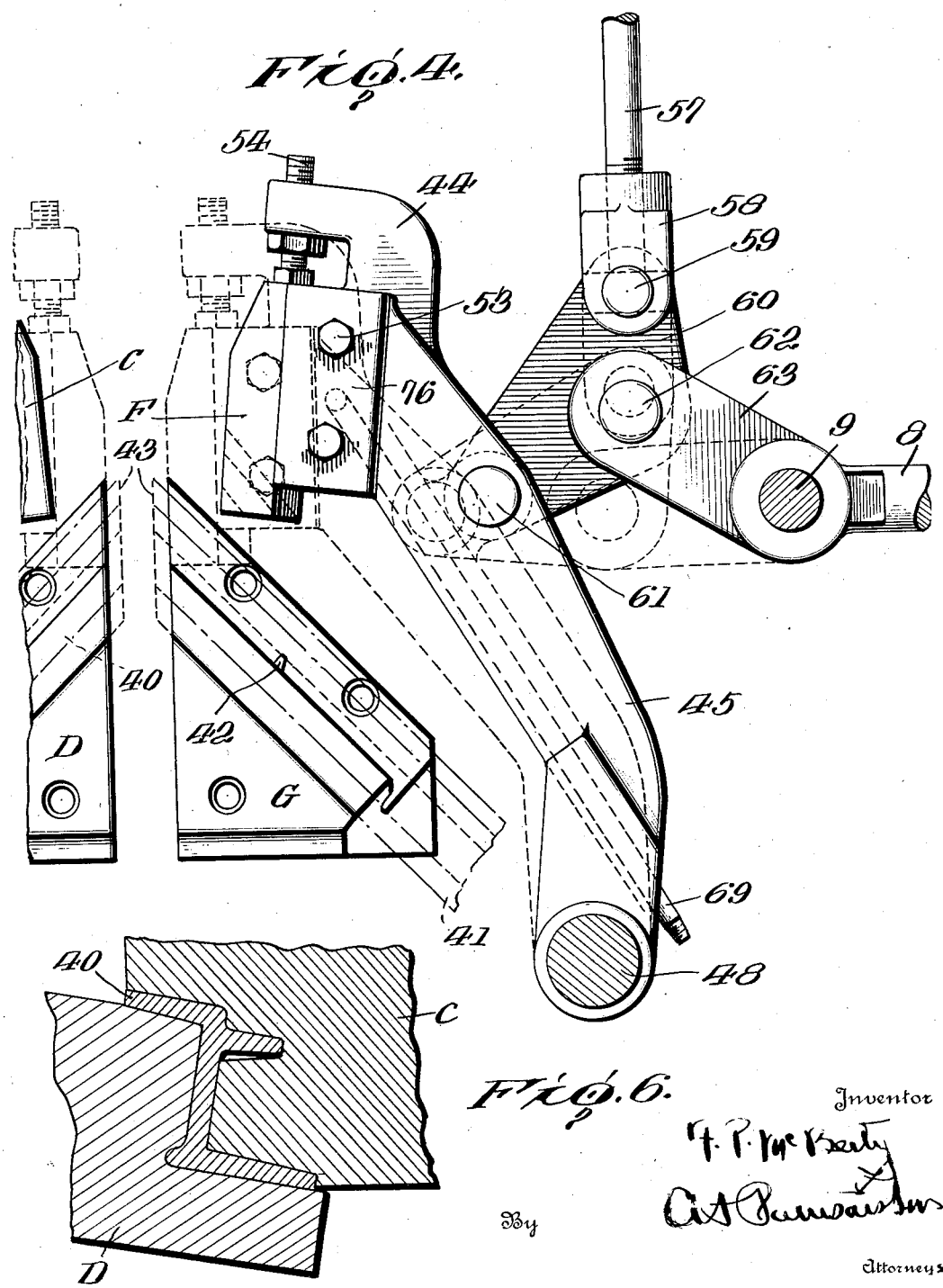

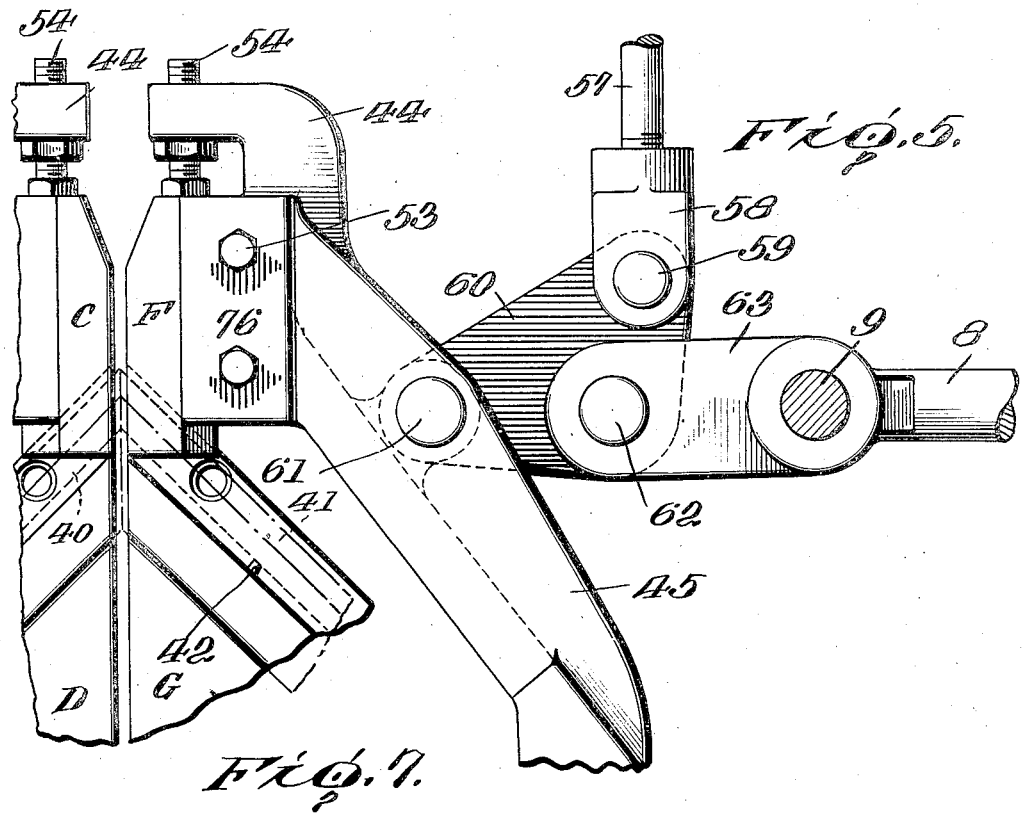
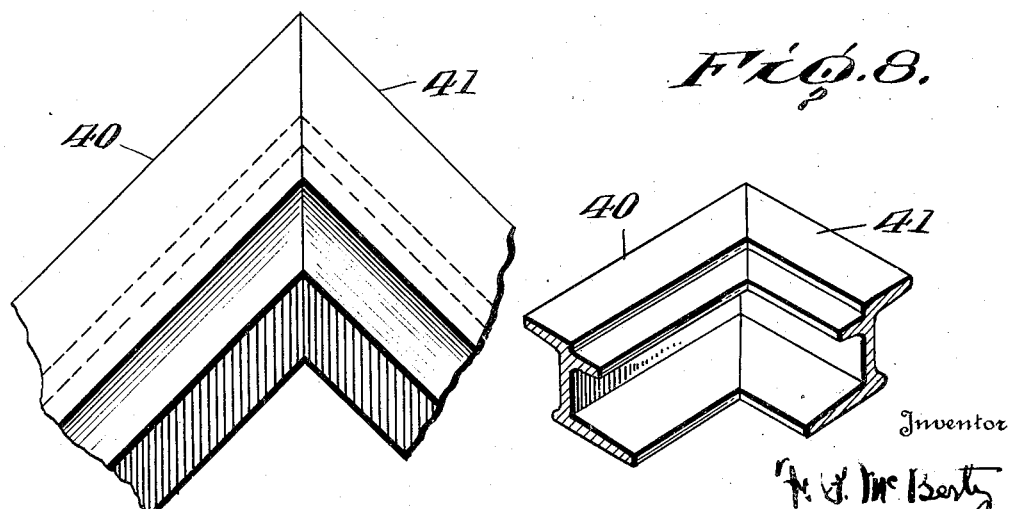

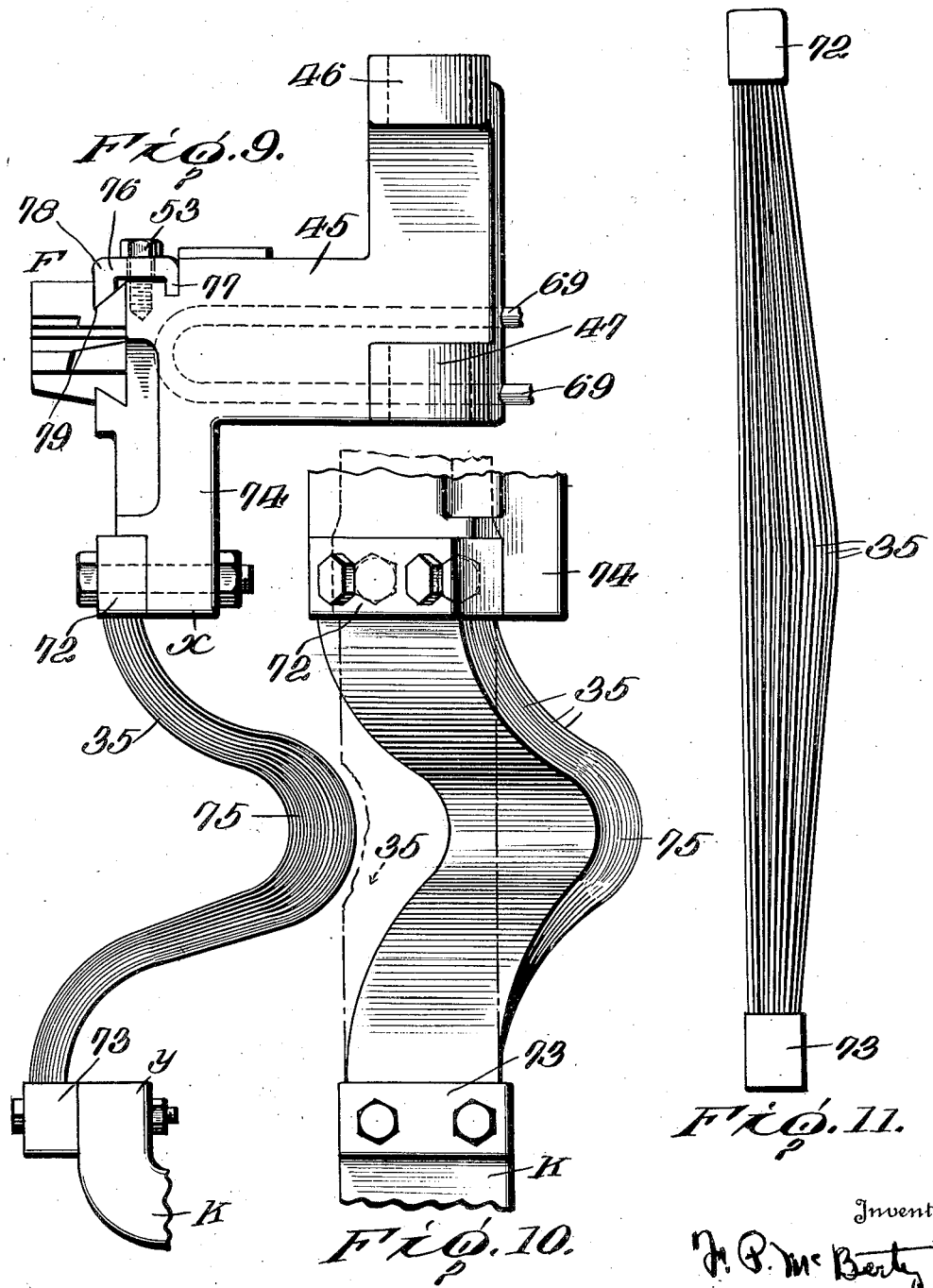

Patented Mar. 7, 1933

1,900,834

UNITED STATES PATENT OFFICE

FRED P. McBERTY, OF WARREN, OHIO

ELECTRIC WELDING MACHINE

Application filed April 22, 1929. Serial No. 357,068.

This invention relates to electric welding machines being more particularly and specifically directed to an electric butt welding machine for making mitre welds such as are necessary in the welding together of steel sash and work of a similar nature.

Although the present machine is referred to above as a butt welder it is sometimes referred to in the art as a flash welder and has even come in some instances to be referred to as a combined flash and butt welder for the reason that in its operation one piece being welded is held stationary while the other is advanced towards it while the electric welding current is on with the result that when the pieces of work come into light contact a flash occurs and is maintained for a short time before the pieces of work are jammed together and upset under pressure, which last step of the operation is in the nature of a butt weld.

The primary object of the invention is the provision of an electric welding machine of a novel construction for electrically welding together the mitered corners or ends of steel sash or the like.

Another object of the invention is the provision of a novel machine of the character described which is fully automatic.

A further object of the invention is the provision in a machine of the character described of welding electrodes pivotally supported and adapted to swing in an arc when clamping the work in place upon the dies of the machine.

A still further object of the invention is the provision of a machine in which the supporting means for the electrodes are water cooled.

Another and further object of the invention is the provision in a machine of the character described of novel transformer electrode leads.

Another and further object of the invention is the provision of means positively assuring the proper positioning of the work upon the dies of the machine.

Another and still further object is the provision in a machine of the character described of movable electrodes which throughout their movement move in the same plane while dies are provided which are positioned at an acute angle to the plane of movement of the electrodes.

A still further object of the invention is the provision of a novel toggle mechanism to operate the swinging electrodes.

Other objects, novel features of construction and improved results of the invention will appear from the following description taken in conjunction with the accompanying drawings.

In the drawings:

Figure 1 is a top plan view of a machine built in accordance with the present invention.

Figure 2 is a view in side elevation of the machine.

Figure 3 is a vertical sectional view taken on the line 3—3 of Figure 2 looking in the direction indicated by arrows.

Figure 4 is a plan view of the electrodes and dies together with the operating toggle for one of the electrodes, the view being taken with the machine heads removed and the open and closed positions of the electrodes being shown in full and dotted lines respectively, the position of the parts being prior to the reciprocation of the movable electrode and die.

Figure 5 is a view similar to that appearing in dotted lines in Figure 4 showing the position of the parts after completion of the welding operation.

Figure 6 is an enlarged detailed vertical sectional view through one of the dies and electrodes showing the exact manner in which the work is clamped in place upon the die and electrical connection made between the work and the electrode.

Figure 7 is a plan view of a welded mitred corner weld of a steel sash such as is made on the present machine.

Figure 8 is a perspective view of Figure 7.

Figure 9 is a detached view of the electrode carrying arm and the flexible transformer lead, the view being in side elevation.

Figure 10 is a fragmentary view of the parts appearing in Figure 9 the view being taken at right angles to that of the other figure, the two positions assumed by the transformer lead being shown in full and dotted lines.

Figure 11 is a view in elevation of the edge of one of the transformer leads prior to its application to the machine.

The present machine is designed and constructed for the purpose of providing a fully automatic electric welder for welding together the mitred corners of steel sash and work of a similar nature as will more clearly appear hereinafter and particularly under the heading of Operation of the Machine.

In the present machine the clamping and releasing of the work is done by means of conveniently placed foot or hand levers controlling the delivery of air to the cylinders the pistons of which operate the swinging electrodes while the starting of the motor and the operation of the machine is accomplished by the mere pushing of the button switch which causes the machine to automatically go through a cycle of operation to make a complete weld.

The machine is further equipped with an automatic brake for arresting all motion of the machine at the end of each cycle of operation.

Other features of the machine which will be dealt with more specifically are that the dies which are of steel are fully insulated from the platens or any electrical connection with the rest of the parts which go into the make-up of the machine and that the clamping of the work is done by copper electrodes which are also in the nature of dies, which electrodes are pivotally mounted to swing in an arc for clamping and releasing the work upon the steel dies. The construction of the dies and the electrodes is such that an even heating of the welds is assured and all sliding gibbed members or constructions of a similar nature which would cause frictional wear between the electrodes and the dies has been eliminated so that the life of the dies and the electrodes is increased many fold.

It will further appear that means are provided for positively assuring the proper positioning of the work so that when a sash is completely welded it is of the proper size to fit the opening for which it is intended.

The machine illustrated in the accompanying drawings is geared so that the welding cycle is approximately seven seconds and when the manual operation of placing work in the machine and removing the work from the machine is included it has been found in practice that this machine can perform two hundred and forty welds per hour although the exact number of welds per hour will vary somewhat with conditions and the skill of the operator.

The steel dies are tilted or set at an angle to the plane in which the electrodes swing and the exact angle of the steel dies is dependent upon the shape of the cross sectional configuration of the sections or work being welded. In some instances the steel dies are tilted at a 12 degree angle while at others they are tilted at as much as a 23 degree angle.

Having pointed out some of the more salient features of improvement of this machine over those now known and having called attention to some of the objects and improved results accomplished by the machine, a detailed and specific description of the construction of the machine will now be given.

Although this machine has been described as being particularly designed for welding together work having mitered ends it can be readily adapted, without departing from the spirit of the invention, for welding together pieces of sash or the like having squared ends.

In the drawings I have illustrated a construction embodying the preferred form of my improved welding machine but it will be readily understood that departures from the specific constructions illustrated and described can be made as a matter of mere mechanical skill without departing from the spirit of the invention as expressed in the appended claims.

The bed of the machine is designated at A and is supported in the usual manner by a plurality of legs 1. At each side of this base and paralleling it adjacent its upper edge are slides having central of their length squared portions 3 while at their ends these slides are rounded as at 4 and reciprocate in the dustless housings or bearings 5.

The particular constructions of these slides and their dustless bearings or housings form no part of this invention but are the subject matter of another invention of the present applicant and are fully described in detail in his copending patent application Serial No. 230,625, filed November 2nd, 1927, since matured into Patent No. 1,732,136, dated Oct. 15, 1929.

At the left hand end of the bed and insulated therefrom is a fixed support B for the swinging electrode C and the fixed die D while supported upon the squared portions 3 of the slides is the support E for the movable and swinging electrode F and the moving or sliding die G, while at the far end of the base is mounted the actuating cam H which works against the roller 16 carried in the bifurcated end of the link 6 whihc has an upwardly extending end 7 in adjustable connection with the threaded end of the rod 8 which rod is connected to the vertical shaft 9 which is mounted on the supplemental base member 10 and under the head 11 whereby when the cam is rotated in a manner which will be hereinafter described the supplemental base member 10 carrying the parts E, F and G will be reciprocated longitudinally of the machine it being evident that this supplemental base is bolted to the squared portions 3 of the slides as indicated at 12.

For the purpose of keeping flying metallic particles and other foreign matter away from the cam and from those parts of the machine which lie immediately below I have provided a cover 13 pivotally mounted as at 14 in the upstanding casting 15 which forms a guideway for this link 6.

The cam is driven through gears within the housing 17 which gears in turn are driven through a sprocket wheel 18 and chain 19 passing over a second sprocket wheel 20 on the shaft of an electric motor 21 which electric motor is attached to a source of electric current in a manner which will be hereinafter more particularly described.

The movable electrode and its die are reciprocated towards the left end of the machine by reason of the cam H but are returned to their normal position in separated relation to the fixed die by hand lever 22 pivotally connected to a bracket 23 and operatively connected to the fixed plate 24.

The shaft 25 upon which the sprocket wheel 18 is mounted extends outwardly beyond the edge of the machine base and is provided with a brake drum which the brake bands 28 engage normally in a braking position. These bands are moved to a released position by means of an electro-magnet 27 mounted intermediate the ends 28 and 29 of the arms 30 and 31 which have operative connection with the brake band. This electro-magnet is connected by a lead 32 with the remote control switch J, which remote control switch is of a type well known and sold on the open market and will be described to some extent hereinafter.

This electro-magnet is supported by a suitable arm or bracket 33 having connection with the machine proper.

Supported beneath the machine and approximately intermediate its length by suitable rods 34 is the transformer K for the welding machine and this transformer is connected with a suitable source of electric current supply.

This transformer is provided with two flexible leads one of which appears in Figure 2 at 35 with the two electrodes C and F and are of a peculiar and novel design as will appear from the description hereinafter.

The dies utilized in the present machine are of steel and both of them are fully insulated from the machine proper as clearly appears at 36 and 37 in Figure 1 of the drawings so that during the operation of the machine there will be no tendency for the electric current to pit or burn them.

These dies are removably supported upon suitable carriers 38 so that they are interchangeable to make the machine capable of operating upon work of different shapes and as clearly appears in Figure 3 of the drawings the die carriers have a tapered upper face 39 so that the dies are set at an angle to the main base A of the machine.

Each set of dies is particularly shaped to receive and support work of a particular cross sectional configuration and in the present instance the cross sectional configuration of the work appears in Figure 8 wherein the two pieces to be welded together are given numerals 40 and 41.

The pieces 40 and 41 are provided adjacent their ends at a previously determined position with holes to cooperate and receive the outwardly extending pins 42 of the dies so that the work can be readily placed upon the dies yet automatically properly positioned thereon.

From a complete reading of the description of this machine and its operation it will be seen that during the operation the ends of the work are burned or flashed away a predetermined amount and the holes in the pieces of work being operated upon are positioned to cause an extension of the ends of the pieces 40 and 41 a distance beyond the ends of the dies slightly in excess of the amount which will be burned from them during the welding operation. The extending ends of the pieces 40 and 41 beyond the dies is illustrated in dotted lines 43 in Figure 4 of the drawings.

Describing the electrodes and their supports it will be seen that the electrodes C and F are removably and adjustably mounted in the ends 44 of the arms 45 the remote ends of which are bifurcated to form bearings 46 and 47 which are pivotally mounted as at 48 and 49, see Figure 3, between the portion 50 of the supplemental base and the extending portion 51 of the head.

These electrodes are made of copper and their complete adjustment and removability are effected by reason of bolts or screws 52, 53 and the set screw 54.

To effect a swinging movement of the electrodes in their respective arcs I have provided at one side of the machine cylinders 55 having therein pistons 56 with elongated piston rods 57 having bifurcated ends 58 pivotally connected as at 59 with one end of the approximately triangular shaped link 60 the opposite end of said link being pivotally connected as at 61 with the electrode carrying arm 45 intermediate the length of said arm while the apex of the triangular shaped link 60 is pivotally connected as at 62 with a link 63 having pivotal connection with the shaft 9.

These links which go into the make-up of what I have termed the toggle are positioned beneath the head 11 and intermediate the head and the supplemental or sliding base.

By reference to Figure 1 the means of supporting the cylinders is indicated as being rods 64 and 65 in separated parallel relation extending horizontally outwardly from the sliding supplemental base and provided at their ends with a cross head 66. Any suitable fluid can be used for the operation of the pistons although air is preferable and delivered to the opposite sides of the piston head through conduits 67 and 68 from a suitable source of supply (not shown) and controlled preferably by means of foot pedals at the front side of the machine the control being such that both pistons can be operated simultaneously or independently as the desire of the operator of the machine might indicate.

Inasmuch as the toggle arrangement and cylinders and cylinder supporting means of both of the electrodes is similar, no duplication of description of these parts is necessary.

As the electrode and its carrying arm during the operation of the machine has a tendency to heat up the operating arm 45 when cast is provided with a circulating pipe 69 for conducting through the arm water or some other cooling medium, the cooling medium entering the arms through one conduit 70 and circulating through the pipe 69 and outwardly through the second conduit 71.

In considering the type of work upon which this machine is adapted to operate the purpose and necessity of the swinging electrodes and the positioning of the dies at an angle to the machine will become apparent.

By reference to Figures 6, 7 and 8 which is a fair illustration of the cross sectional contour of the pieces of work upon which this machine operates, it will be seen that there are a plurality of faces of the work which must be contacted by the electrodes to effect a complete and perfect weld and by reference to Figure 6 particularly it will be seen that the presentation of the work to the electrodes at an angle effects and assures a contact practically throughout the entire cross sectional area of the end of the pieces of material being operated upon and that the electrode when actuated by the toggle mechanism swings into proper abutting and clamping relation with the work without any frictional wear, which is highly desirable and essentially necessary to prevent the necessity of constantly replacing both the dies and electrodes and makes possible the keeping of the dies in alignment to maintain their holding effect upon the work.

It will be obvious that when desiring to operate upon work of different cross sectional configuration this can be effected by the replacement in the machine of dies and electrodes of a proper shape to cooperate with the cross sectional configuration of the work being welded in the machine.

Due to the peculiar movement of the electrodes which is new in this art in that they swing in an arc the problem of connecting the electrodes to the transformer has been solved in a novel manner which was only discovered after long and tedious experimentation.

In this connection although I use a flexible lead which before application to the machine is such as is commonly known in the art and is designated at 35 in Figure 11 of the drawings, inventive concept in its application to this machine is present.

In welding machines where the movement of the electrodes is in a straight line as has been heretofore the practice the flexibility of the electrode leads was merely in one direction—namely transverse the copper plates of which the lead is composed.

In the present machine however it is necessary that the lead have flexibility not only transverse the plates which make up the leads but also have flexibility longitudinally of the plates which go into the make-up of the lead.

I have solved this problem in the manner indicated in Figures 9 and 10 of the drawings and as partially illustrated in Figure 3 of the drawings wherein it will be seen that the ends 72 and 73 of the leads are fastened to the transformer K and to that downwardly extending portion 74 of the electrode carrying arm 45 in such a manner that these ends of the electrodes are in a plane at approximately right angles to the remaining and main portion of the electrode with the exception of that part which is in an acute bend as indicated at 75 and in respect to that portion of the electrode the ends are in the same plane but in separated horizontal relation thereto.

If these leads were attached in the usual and conventional manner, having reference to Figure 9 of the drawings, the ends 72 and 73 instead of being fastened to the vertical faces of the transformer K and the vertical side wall of portion 74 would be attached to the horizontal faces of these parts which I have designated as X and Y.

By attaching the electrode leads in the manner illustrated and described they have the desired and necessary flexibility in the two directions mentioned to permit the movement of the swinging electrodes but should they be mounted in the conventional manner above described they would not have the longitudinal flexibility necessary and would lock the electrodes against movement. Repeated tests have proven this fact.

In Figures 9 and 10 I have attempted to illustrate the movement or flexible give of these electrode leads. Figure 9 illustrates the lead in the position it assumes when the movable electrodes are in the position illustrated in Figure 1 of the drawings or what might be termed unclamped position, whereas Figure 10 illustrates the distortion which takes place in the lead when the electrodes have been swung to the position shown in Figures 6, 7 and in dotted lines in Figure 4 of the drawings. Here it will be seen that the electrode lead has yielded so that it has given or twisted in a direction longitudinal of itself as well as in a direction transverse the plates making up the electrode.

In describing the machine it has been mentioned that the fixed die and fixed electrode support is at the left hand end of the machine but it will be readily apparent that the machine could be reversed so as to make it what might be termed a right instead of a left hand machine.

It has also been found that it has sometmes been desirable to shorten the legs at that side of the machine which carries the dies in an amount to bring the slanting dies in a plane horizontal to the floor upon which the machine is supported. This is merely done for convenience in feeding or placing upon the dies the work to be operated upon. With the machine as illustrated in the drawings it is necessary to elevate the outer ends of the pieces which are placed upon the dies whereas with the legs of the machine shortened the pieces of work can be held in horizontal plane when placing the ends of the pieces upon the dies which under some circumstances might be desirable.

Another feature of construction to be noted in this machine is that the point of pivotal support of the arms carrying the electrodes is at a point in front of or nearer the outer edge of the machine than are the fixed dies.

In speaking of the electrodes attention is directed to Figure 9 of the drawings wherein the cross sectional shape of the holder 76 clearly appears. Here it will be seen that the holder is U-shaped, one leg 77 of the U engaging a suitable groove in the arm 45 while the other leg 76 of the U is tapered or beveled to engage the V-shaped longitudinal groove 79 in the upper face of the electrode.

Mention has already been made of the pins 42 for automatically positioning the work on the dies and in this connection it is mentioned that a reverse construction could be used without departing from the spirit of the invention wherein the dies would be provided with holes to receive pins carried by the work to accomplish the same end of automatically positioning the work on the dies.

Specific mention should be made at this time of the construction of the driving or actuating cams H. This cam is shaped so that it will impart to the movable or sliding electrode and sliding die a gradually increasing speed up to the time when the upsetting of the metal in the welds occurs by reason of the enlarged projection or hump 80 of the cam engaging the roller 16. This cam revolves clockwise as indicated by arrow in Figure 1 of the drawings.

*Operation*

Having described in detail the component parts making up my improved welding machine, one cycle of operation of the machine will now be described.

Referring to Figure 1 it will be seen that the machine is at a stand-still after the completion of a cycle of operation and is ready to receive the pieces of work or sash 40 and 41 making up two sides of a sash frame or the like. These pieces 40 and 41 are placed on the fixed steel dies in the manner illustrated in Figure 4 of the drawings with the holes in the work over the pins 42 of the dies and it will be seen that the ends 43 of the work extend outwardly beyond the ends of the dies.

The operator of the machine now depresses the outer ends of the foot pedals 81 and 82 which controls the delivery of air to the cylinders 55 and this effects a clamping of the work on the dies by the swinging electrodes C and F in the manner illustrated in Figures 4 and 6 of the drawings so that the work is held tightly in place upon the dies and the electrode is in firm engagement throughout the areas of the ends of the work to effect an even distribution of current and heat to the work at the time the welding current is turned on.

It is not thought a description is necessary of the operation of the toggles which effect the swinging of the electrodes into their clamped position as this will be clearly apparent from an examination of Figure 4 of the drawings.

When the electrodes have been swung into their clamping positions the transformer leads have been distorted from the position they assume as illustrated in Figure 9 to that illustrated in Figure 10 of the drawings.

There are two distinct electric lines running to the machine, one for delivering current to the driving motor 21 and the other delivering current to the transformer and both of these circuits are automatically controlled by switches O and P which are pivotally mounted as at 83 and 84 at the end of the machine. The switch O controls the motor circuit and is actuated by a suitable cam 85 while the switch P controls the transformer circuit and is actuated by two cams 86 and 87 all of said cams being adjustably mounted on the vertical shaft 88 which is the driving shaft for the main actuating cam H.

When the machine has completed a cycle these cams are adjusted to break the circuit to both the motor and the transformer so that to start the machine it is necessary to bridge around these switches until the electric motor has rotated the shaft 88 to a point where the cams have passed out of engagement with the switches O and P so as to permit these switches to close, which they will do because their normal position is that of closing the circuits which they control. That is to say, springs normally hold these switches in a closed position.

To effect the bridging of the current around the switches O and P I have merely used an equipment which is sold on the open market and commonly found in use on welding machines, and comprises a control box Q conveniently placed on the side of the machine to the hand of the operator. This control box is in turn electrically connected through a suitable wiring 89 with the remote control switch J which is also an electrical device found and sold on the open market.

By operating through the push button the switch in the control box Q the current is delivered to the driving motor and to the electro-magnet 27 so that the brake is released and the cam H is rotated to move the sliding electrode and sliding die towards the stationary electrode and the stationary die.

By proper adjustment cams 86 and 87 will permit the switch P to close at the proper time for the delivery of current to the electrodes from the transformer which is at a time slightly prior to the actual engagement of the work pieces 40 and 41.

The transformer current being in the electrodes C and F an arc will occur between the pieces of work as soon as they come into light engagement and due to the slowly increasing speed of the sliding electrode this arc will be maintained up to the time that the raised portion 80 of the cam effects an upsetting of the ends of the work being welded together, it being understood that the arc has been maintained a sufficient time to properly heat the ends of the work so that when the upsetting occurs a proper weld will be made.

The enlargement 80 of the cam is of such a length that the roller 16 will drop off of its far end immediately upon the proper upsetting of the work and the cams 86 and 87 controlling the switch P are also positioned to open the switch P and thereby open the transformer circuit at a very slight interval of time after the upsetting occurs.

The cam 85 is also properly positioned to brake the motor circuit through the switch P at the same instant that the roller 16 drops off of the cam enlargement 80, thereby stopping the motor by opening the motor circuit and simultaneously opening the circuit to the electro-magnet 27 which has been energized throughout the cycle of operation thus far described. Immediately the circuit to the electro-magnet is opened the brake is automatically applied due to the springs 90 which normally hold the brake in engagement with the brake drum and the application of the brake immediately arrests all movement of the apparatus.

It has been previously mentioned that the amount of metal to be burned from the pieces of work has been previously determined and the pieces of work elongated an amount equal to that which will be burned or flashed from their ends during the welding operation.

By reference to Figure 5 of the drawings which illustrates the position of the parts upon the completion of a weld, it will be seen that the ends of the pieces of work extend beyond the dies after the weld has been completed, or in other words the work extends when originally placed on the dies an amount greater than that which will be burned from them.

This is done to permit the removal of the work from the dies after the weld has been completed.

In removing the completed weld from the machine the opposite ends of the foot pedal 81 and 82 are depressed to deliver air to the opposite sides of the pistons 56 to return the electrodes to their original or unclamped position as shown in Figure 1.

The hand lever 22 is then grasped to move the sliding die G slightly towards the fixed die D and this permits the completed weld to be lifted from the dies which would not be possible without this additional movement due to the pins 42 which interlock with the openings in the work pieces.

Upon the removal of the completed weld the sliding electrode and die are returned to their original position, Figure 1, for a repitition of a cycle of operation, just described, by the operator of the machine through the medium of the hand lever 22.

By reference to Figures 4 and 5 of the drawings it will be seen that when the toggles have been operated to swing the electrodes into clamping position that the links 60 and 63 are slightly beyond dead center and that this effectively and positively locks the electrode carrying arms against any possible movement whatsoever which would tend to lessen the clamping of the work upon the supports.

Attention is also directed to the fact that as the present machine is designed for the purpose of welding together work pieces having mitered ends the work supporting members or dies are so shaped as to support the work at an angle across the dies so that the mitered ends of the work come into abutment throughout their widths when the movable die and its cooperating electrode are moved towards one another.

From a reading of the description of operation it will be seen that the machine is practically automatic in its operation as there is no manual function in a cycle of operation after the starting button has been once pushed.

Attention is called to the fact that the pivotal support for the swinging electrode carrying arms is outboard of the machine in respect to the work dies although this positioning is not absolutely necessary it being only essential that the arc of swing of the electrode be such that the electrodes come into engagement with the work to clamp and engage it properly without setting up any friction.

Having thus described my invention what I claim and desire to secure by Letters Patent is:

1. In an electric welding machine for welding together two pieces of work by the combined flash and butt weld method, a pair of supports for said pieces of work, and means carried by said supports for cooperating with the parts of said pieces of work supported on said supports to positively properly position the pieces of work upon said supports in a manner to compensate for the metal burned from said pieces of work during the flashing operation of the machine.

2. In an electric welding machine, a fixed work support and a swinging electrode cooperating therewith to clamp the work upon the support, a movable work support and a swinging electrode movable and cooperative therewith to clamp the work upon said support, means to move said electrodes into and out of engagement with said work, and means to move said movable work support and its cooperating electrode towards said fixed support and its cooperating electrode to effect a welding together of the work clamped upon and carried by said supports.

3. In an electric welding machine, a fixed work support and a movable work support, swinging electrodes cooperating with said supports to clamp the work upon the same, means to swing said electrodes into and out of engagement with said work, means to move said movable work support and its cooperating electrode towards said fixed support and its cooperating electrode to effect a welding together of the work clamped upon and carried by said supports, and means to effect a stoppage of the movable work support moving means immediately upon the completion of the welding operation.

4. In an electric welding machine for welding together the mitered ends of pieces of work or material, a pair of work receiving and supporting members, a pair of electrodes pivotally mounted upon said machine and cooperating with said work supporting means to clamp the work thereupon, said work supporting means positioning the work so that their ends can be moved into abutting relation throughout the width thereof, and said work supporting means further positioning and presenting said work to said electrodes at an angle across the plane in which said electrodes move when clamping the work upon the supports.

5. An electric welding machine for welding together the mitered ends of steel sash or similar metal pieces having irregular cross sectional configuration comprising a pair of dies one of which is movable towards the other, said dies having their faces shaped to receive and support said sash members, a pair of electrodes pivotally mounted and provided with means to swing them into and out of engagement with the work upon said dies for clamping the work in position thereupon and delivering current to the work, and means to move said movable work support towards said fixed work support to effect a welding together of the work clamped upon and carried by said supports.

6. In an electric welding machine for welding together the mitered ends of steel sash or work of a similar nature by a combined flash and butt welding method, comprising a pair of work supports one of which is movable in respect to the other, electrodes pivotally mounted and cooperative with said work supports for clamping the work upon the supports and delivering electric welding current thereto, said work supports insulated from said machine, means to move said movable work support and the work carried thereupon towards the fixed work support and the work carried thereby to effect a welding together of the ends of said work, and an automatically operated brake for arresting the movement of the movable work support moving means upon the completion of the welding operation.

7. In an electric welding machine for welding together the ends of pieces of work by a combined flash and butt weld method, comprising a pair of work supports one of which is movable towards the other, a pair of pivotally mounted and swinging electrodes for cooperation with said work supports for clamping the work upon said supports and delivering electric welding current thereto, cooperative means between said work support and said pieces of work to positively properly position the pieces of work upon said supports in a manner to compensate for the metal burned from said pieces of work during the welding operation of the machine, said work supporting means further presenting said work to said electrodes at an angle across the plane in which said electrodes move, and means to move said movable work support and the work carried thereby towards said fixed work support and the work thereon to effect a welding together of the ends of the work clamped upon and carried by said supports.

8. In combination with an electric welding machine having a pivotally mounted and swinging electrode and a fixed transformer, a transformer lead connecting said electrode and transformer, said transformer lead bent upon itself intermediate its length into an approximate U-shape, the ends of said lead bent at right angle to the legs of said U, and said end portions fastened to the electrode and the transformer respectively, whereby said electrode is resilient both transversely and longitudinally of itself to provide a connection to permit the swinging of said electrode.

9. In an electric welding machine having work supporting means, an electrode pivotally mounted upon said machine, means comprising a toggle made up of a plurality of links for moving said electrode into and out of engagement with said work to clamp the work upon said support, and the links of said toggle positioned to lock said electrode against movement when the electrode is in its clamping position.

10. In an electric welding machine for welding together the corners of metal sash or like pieces having an irregular cross sectional configuration comprising a pair of work receiving and supporting members, a pair of electrodes pivotally mounted upon said machine, means to swing said electrodes into and out of engagement with said work to clamp the same upon said work supports, said work supports shaped to receive and engage one side and the bottom of said sash members, and the electrodes shaped to engage the other side of said sash members including the top of the members and the top or upper surface of the bottom of the members, whereby said work is clamped firmly in place and welding current is delivered by the electrode to the entire area of the ends of the sash members.

11. In an electric welding machine having a base, work supporting means on said machine tilted at an angle across the plane of said base, electrodes pivotally mounted in respect to said base and adapted to swing in an arc horizontally transverse said base, and means to swing said electrodes into and out of engagement with said work to clamp the same upon said supports and deliver electric welding current to the work.

12. In combination with an electric welding machine having a pivotally mounted and swinging electrode and a fixed transformer, a transformer lead composed of a plurality of thin current conducting plates connecting said electrode and transformer, said plates making up said transformer lead bent upon themselves intermediate their lengths to form an approximate U shape, the ends of said plates bent at a right angle to the legs of said U, and said end portions fastened to the electrode and the transformer respectively, whereby said lead is resilient both transverse and longitudinal of the plates of which it is composed to provide a connection which permits the swinging of said electrode.

13. An electric welding machine for welding together the ends of steel sash or work of a similar nature, comprising a pair of work supports one of which is movable longitudinal of the machine in respect to the other support, electrodes pivotally mounted and adapted to swing in an arc transverse said machine to cooperate with said work supports to clamp the work upon the same and deliver electric welding current to the work, said work supports provided with means cooperating with the work to positively position the same with the ends of the pieces of work extending beyond the supports at their adjacent sides, said work supporting means further positioning and presenting said work to said electrodes at an angle across the plane of the arc in which said electrodes swing when clamping the work upon the supports, and means to move said movable work support and the work carried thereby towards the fixed work support and the work locked thereupon to bring the extending ends of the pieces of work together to effect a welding together of the ends of the work.

14. An electric welding machine for welding together the ends of steel sections for the production of window sash or work of a similar nature, comprising a pair of work supports one of which is movable towards and away from the other, a pair of electrodes connected with a suitable source of current supply and pivotally mounted to swing in an arc transverse the machine to cooperate with said work supports for clamping the work upon the supports and delivering electric welding current thereto, means to swing said electrodes upon their supports, means carried by said work supports for positively positioning the work so that the ends of the pieces of work extend beyond the supports at the adjacent sides thereof, said work supports further positioning and presenting said work to said electrodes at an angle across the plane of the arc in which said electrodes swing when clamping the work upon the supports, means to move said movable work support and the work carried thereby slowly with gradually increasing speed towards the fixed work support and the work carried thereby and to give to the movable work support a sudden and final rapid movement to bring the ends of the work into abutment and upset the same to effect a welding together of the ends of the work, and means to stop the delivery of current to the electrodes immediately upon the completion of the upset of the ends of the work.

15. In an electric welding machine having work supporting means, electrodes pivotally mounted upon said machine, means to move said electrodes into and out of engagement with said work, said work supporting means positioning and presenting the work to said electrodes at an angle to the horizontal plane in which said electrodes move.

16. In an electric welding machine, a pair of work receiving and supporting members, a pair of electrodes pivotally mounted upon said machine and cooperating with said work supporting means to clamp the work thereupon, and said work supporting means positioning and presenting the work to said electrodes at an angle across the horizontal plane in which said electrodes move.

17. An electric welding machine comprising a horizontal base, work supporting means mounted upon said base at an angle across the horizontal plane thereof, and electrodes pivotally mounted and adapted to swing across said base in a horizontal plane parallel to the parallel plane of the base, and means to swing said electrodes upon their pivotal support into and out of engagement with said work supporting means to clamp the work upon said supports, for the purpose described.

18. In an electric welding machine, a fixed work support and a movable work support, means to move said movable work support towards said fixed support, a brake normally preventing the operation of said movable work support moving means, an electromagnet for releasing said brake, means to energize said magnet, and means for de-energizing said magnet at a predetermined time, for the purpose described.

19. In an electric welding machine, a fixed work support and a movable work support, mechanical means to bring the work supports together to effect a welding together of work carried by the supports, a combined spring and electro-magnetically operated brake normally preventing operation of the mechanical means for moving said movable work support, manually operated means to energize the electromagnet to release the brake and start the movement of the movable work support towards the fixed work support, and automatic means operating upon the completion of the welding operation of the machine to stop the machine and to de-energize the electromagnet and permit the spring to set the brake and arrest all movement of the machine drive.

20. In an electric welding machine, a work supporting die for positioning work at an angle to the transverse axis of the machine, an electrode mounted to swing in a horizontal arc towards and away from said work holding die, said electrode having arranged in its end a cutout portion extending at an acute angle to its transverse axis, and the end of the electrode adapted to engage and force work into abutment with the die for the purpose described.

21. In an electric welding machine, having work supporting means, clamping means pivotally mounted in respect to said work supporting means upon said machine to swing in a horizontal plane on the machine, and means to swing said clamps into and out of engagement with said work, for the purpose described.

22. In a mechanically driven electric welding machine wherein the machine has an automatic cycle of operation which includes an automatic cut-off of the welding current upon the completion of the weld, an electro-magnetic brake automatically brought into operation by said driving means for stopping said driving means at the end of each cycle of operation in a proper position to permit a loading of the machine with work preparatory to another cycle of operation.

23. In an electric welding machine for welding together pieces having an irregular cross sectional configuration, comprising a pair of work receiving and supporting members, a pair of electrodes, means to clamp the work between the work supports and the electrodes, and said work supports and said electrodes shaped to surround and engage the faces of said irregular shaped pieces of work and deliver welding current to the entire cross sectional area of said pieces at the points where they are clamped.

24. In an electric welding machine, a pair of electrodes pivoted on the machine so as to be capable of swinging movement in a substantially horizontal plane relative to a pair of work supports, the said work supports presenting the work to the electrodes at an angle to the substantially horizontal plane in which the electrodes move, and means to move the work into engagement to effect an electric welding thereof.

25. In an electric welding machine, a swinging copper electrode, a fixed steel work support on said machine and insulated therefrom, and means to swing said electrode to clamp work upon the support and deliver current thereto, whereby said electrode is a clamp for and the sole current conductor to the work.

26. An electric welding machine comprising a horizontal base, work supporting means mounted upon said base at an angle across the horizontal plane thereof, said work supporting means adapted to support pieces of work in a horizontal plane and at a forty-five degree angle in respect to one another, one of said work holders movable in respect to the other, electrodes movably mounted and adapted to be moved across said base in a horizontal plane parallel to the plane of the base and to engage the work upon the work supporting means and clamp the same thereupon and deliver welding current thereto, and means to move the movable work supporting means towards the other work supporting means to bring the ends of the work together to effect a welding thereof.

27. In a mechanically driven electric welding machine having an automatic cycle of operation, a brake brought into operation by said machine driving means for stopping said driving means at the end of each cycle of operation upon the completion of the weld.

28. In an electric welding machine, a fixed work support and a movable work support, mechanically driven means to move said movable work support towards said fixed support, a brake normally preventing the operation of said movable work support driving means, automatic means for releasing said brake, automatic means to set said brake at a predetermined time, for the purpose described.

29. In an electric welding machine, an arm, an electrode movably mounted on said arm a set screw on said arm engaging said electrode, and means to adjust said set screw to move the electrode on the arm and hold it against movement in one direction.

30. In an electric welding machine, an arm, an electrode having sliding tongue and groove connection with said arm, and means behind one end of the electrode to slidably adjust the electrode in its slideway.

31. In an electric welding machine, an arm having a slideway, an electrode having a tongue slidably engaging said slideway, means behind one end of said slideway to engage and slidably adjust the electrode in the slideway, and means forming one side of said slideway for adjustably clamping the electrode tongue.

32. In an electric welding machine for welding together two pieces of work by the combined flash and butt weld method, a pair of supports for said pieces of work, and extending pins carried by said supports for entering and positively properly positioning the pieces of work upon the supports in a manner to compensate for the metal burned from said pieces of work during the flashing operation of the machine.

In testimony whereof I hereunto affix my signature.

FRED P. McBERTY.